US010189202B2

(12) United States Patent
Morikami et al.

(10) Patent No.: US 10,189,202 B2
(45) Date of Patent: Jan. 29, 2019

(54) BLOW MOLDING DEVICE

(71) Applicant: DISCMA AG, Hunenberg (CH)

(72) Inventors: Shigeki Morikami, Kanagawa (JP);
Mitsuru Shiokawa, Kanagawa (JP);
Yuichi Okuyama, Kanagawa (JP)

(73) Assignee: DISCMA AG, Zürich (CH)

( * ) Notice: Subject to any disclaimer, the term of this patent is extended or adjusted under 35 U.S.C. 154(b) by 0 days.

(21) Appl. No.: 15/557,698

(22) PCT Filed: Feb. 1, 2016

(86) PCT No.: PCT/JP2016/000499
§ 371 (c)(1),
(2) Date: Sep. 12, 2017

(87) PCT Pub. No.: WO2016/147531
PCT Pub. Date: Sep. 22, 2016

(65) Prior Publication Data
US 2018/0043606 A1    Feb. 15, 2018

(30) Foreign Application Priority Data

Mar. 13, 2015  (JP) ................................. 2015-051470
Mar. 13, 2015  (JP) ................................. 2015-051471
Mar. 13, 2015  (JP) ................................. 2015-051477

(51) Int. Cl.
*B29C 49/46*       (2006.01)
*B29C 49/58*       (2006.01)
(Continued)

(52) U.S. Cl.
CPC .............. *B29C 49/58* (2013.01); *B29C 49/04* (2013.01); *B29C 49/06* (2013.01); *B29C 49/12* (2013.01);
(Continued)

(58) Field of Classification Search
CPC .. B29C 49/46; B29C 2049/4664; B29C 49/58
See application file for complete search history.

(56) References Cited

U.S. PATENT DOCUMENTS

2013/0180219 A1*  7/2013  Chauvin ................. B65B 3/022
                                                       53/559
2015/0328824 A1   11/2015  Morikami et al.
(Continued)

FOREIGN PATENT DOCUMENTS

WO    WO-2013096609 A1 *  6/2013  ........... B29D 22/003
WO    WO-2015183279 A1 * 12/2015  ............. B29C 49/58

*Primary Examiner* — Robert B Davis
(74) *Attorney, Agent, or Firm* — Eric J. Sosenko; Jonathan P. O'Brien; Honigman Miller Schwartz and Cohn LLP

(57) ABSTRACT

A blow molding device is provided with a mold in which a preform is disposed, a cylindrical nozzle that is inserted into a mouth part of the preform, a pressurized fluid supply part for supplying a pressurized incompressible fluid to the nozzle, a sealing body that is movable between a closed position that blocks the nozzle and an open position that opens the nozzle, a plurality of suction holes provided on an inner peripheral surface of the nozzle, a vertical hole provided extending along the axial direction of the nozzle for connecting a plurality of suction holes to each other, and a suction pump connected to the vertical hole via a suction path for applying suction force to a plurality of the suction holes for suctioning incompressible fluid adhered to the nozzle.

8 Claims, 5 Drawing Sheets

(51) Int. Cl.
*B29C 49/04* (2006.01)
*B29C 49/06* (2006.01)
*B29C 49/12* (2006.01)
B29K 23/00 (2006.01)
B29K 67/00 (2006.01)
B29L 31/00 (2006.01)

(52) U.S. Cl.
CPC ...... *B29C 49/46* (2013.01); *B29C 2049/4664* (2013.01); *B29K 2023/06* (2013.01); *B29K 2023/12* (2013.01); *B29K 2067/003* (2013.01); *B29L 2031/7158* (2013.01)

(56) References Cited

U.S. PATENT DOCUMENTS

2016/0107366 A1* 4/2016 Gillet .................... B08B 9/0325
    134/22.12
2016/0200029 A1* 7/2016 Shiokawa ............... B29C 49/46
    425/524

* cited by examiner

BLOW MOLDING DEVICE

TECHNICAL FIELD

The present invention relates to a blow molding device for blow molding a resin preform into a container of a predetermined shape, and particularly relates to one that uses an incompressible fluid, such as a liquid, as a pressurized fluid that performs blow molding.

BACKGROUND

Resin containers, represented by polypropylene (PP) bottles or polyethylene terephthalate (PET) bottles (PET bottles), are used for accommodating various contents, such as drinks, makeup products, medicines, soaps, and shampoos. Such a container is generally formed into a predetermined shape by heating a resin preform, having a bottomed tube shape and formed by injection molding or the like, to a temperature that allows a stretching effect to be exhibited, and in this state, biaxial stretch blow molding using a blow molding device.

As for blow molding devices, one that uses a pressurized, incompressible fluid, such as a liquid, in place of pressurized air as the pressurized fluid for supplying into the preform is known. In this case, by using contents that are to be ultimately filled in the container as the product as the pressurized fluid, such as a drink, the process for filling the container with the contents can be omitted, and the production process thereof and the configuration of the blow molding device can be simplified.

For example, in Japanese Unexamined Patent Application Publication No. 2013-208834 is described a blow molding device provided with a mold for blow forming and into which a preform, which has been heated to a stretchable temperature, is mounted. A nozzle is inserted into the mouth part of the preform and a pressurized fluid supply part supplies a pressurized liquid into the preform via the nozzle. A stretching rod that is movable in the vertical direction, tretches the preform in the vertical direction (axial direction) while pressurized liquid is supplied into the preform to stretch the preform in the horizontal direction (radial direction), and the preform is molded into a container with a shape following the cavity of the mold.

With a conventional blow molding device such as that illustrated in the above mentioned Patent Application Publication, when the nozzle is raised after blow molding and separated from the mouth part of the container, liquid (incompressible fluid) adhered to the surface of the nozzle or the surface of the stretching rod can drip and fall downward. In particular, when using a liquid with relatively high viscosity such as shampoo or liquid soap as the incompressible fluid for performing blow molding, the time until liquid drips and falls from the nozzle and the like after blow molding is long, and further, because the liquid continues to drip for a while, as if to draw out a string of liquid, there are problems in that the liquid drips and falls onto the container after blow molding, or onto the mold after the container is pulled out, making these dirty.

In view of the foregoing, an object of the present invention is to provide a blow molding device that can prevent an incompressible fluid from dropping and falling from a nozzle and adhering to the container or mold after molding, when the nozzle is separated from the mouth part after blow molding.

SUMMARY OF THE INVENTION

In one aspect, a blow molding device embodying the principles of the present invention is a blow molding device for blow forming a resin preform into a container of a predetermined shape, provided with: a mold for blow forming in which the preform is disposed; a cylindrical nozzle that is inserted into a mouth part of the preform from a lower end side; a pressurized fluid supply part for supplying a pressurized incompressible fluid to the nozzle via a supply channel connected from an upper end side; a sealing body that is movable between a closed position that contacts the nozzle and blocks the nozzle, and an open position that is apart from the nozzle and opens the nozzle;
a plurality of suction holes provided on an inner peripheral surface of the nozzle in a row toward an axial direction of the nozzle; a vertical hole provided extending along the axial direction of the nozzle for connecting a plurality of suction holes to each other, and a suction pump connected to the vertical hole via a suction path for applying suction force to a plurality of the suction holes for suctioning incompressible fluid adhered to the nozzle.

In another aspect, the blow molding device preferably has, within the above configuration, the vertical hole opening toward a bottom end surface of the nozzle and forming the downward-facing suction holes.

In a further aspect, the blow molding device preferably has, within the above configuration, a plurality of ring-shaped slits provided on the inner peripheral surface of the nozzle in a row toward the axial direction of the nozzle, and the suction holes formed at regions where each ring-shaped slit intersects with the vertical hole.

In an additional aspect, the blow molding device preferably has, within the above configuration, the sealing body provided with a sealing body main body part that contacts the nozzle when the sealing body is in the closed position, and an extended part that is provided protruding downward from the sealing body main body, and disposed on the inside of the nozzle leaving a slight gap to the inner peripheral surface of the nozzle when the sealing body is in the closed position, wherein a lower end of the extended part is near the lowest disposed suction hole when the sealing body is in the closed position.

In yet another aspect, the blow molding device preferably has, within the above configuration, a sealing body provided with a sealing body main body part that contacts the nozzle when the sealing body is in the closed position, and an extended part that is provided protruding downward from the sealing body main body, and disposed on the inside of the nozzle leaving a slight gap to the inner peripheral surface of the nozzle when the sealing body is in the closed position, wherein a lower end of the extended part is near the lower end surface of the nozzle when the sealing body is in the closed position.

In still a further aspect, the blow molding device preferably has, within the above configuration, the lowest-disposed suction hole from among the plurality of suction holes disposed in the vicinity of the lower end of the nozzle.

In yet an additional aspect, the blow molding device preferably has, within the above configuration, a stretching rod, provided at the axial center of the sealing body so as to be relatively movable in the axial direction relative to the sealing body, that moves downward when blow molding and stretches the preform in the axial direction, wherein after extending the preform, the stretching rod rises to a position such that the lower end of the stretching rod matches the lower end of the sealing body when the sealing body is put in the closed position, and rises synchronized with the sealing body when the sealing body rises from the mouth part with the nozzle.

In another aspect, the blow molding device preferably has, within the above configuration, the viscosity of the incompressible fluid at the time of being supplied to the preform being 10000 mPa·s or less.

Accordingly, a blow molding device is provided that can prevent residual portions of an incompressible fluid from dropping and falling from a nozzle and adhering to the container and mold after molding when the nozzle is separated from the mouth part after blow molding.

DETAILED DESCRIPTION

A blow molding device embodying the principles of the present invention is described below more specifically and with examples, and with reference to the drawings.

Figure 1:
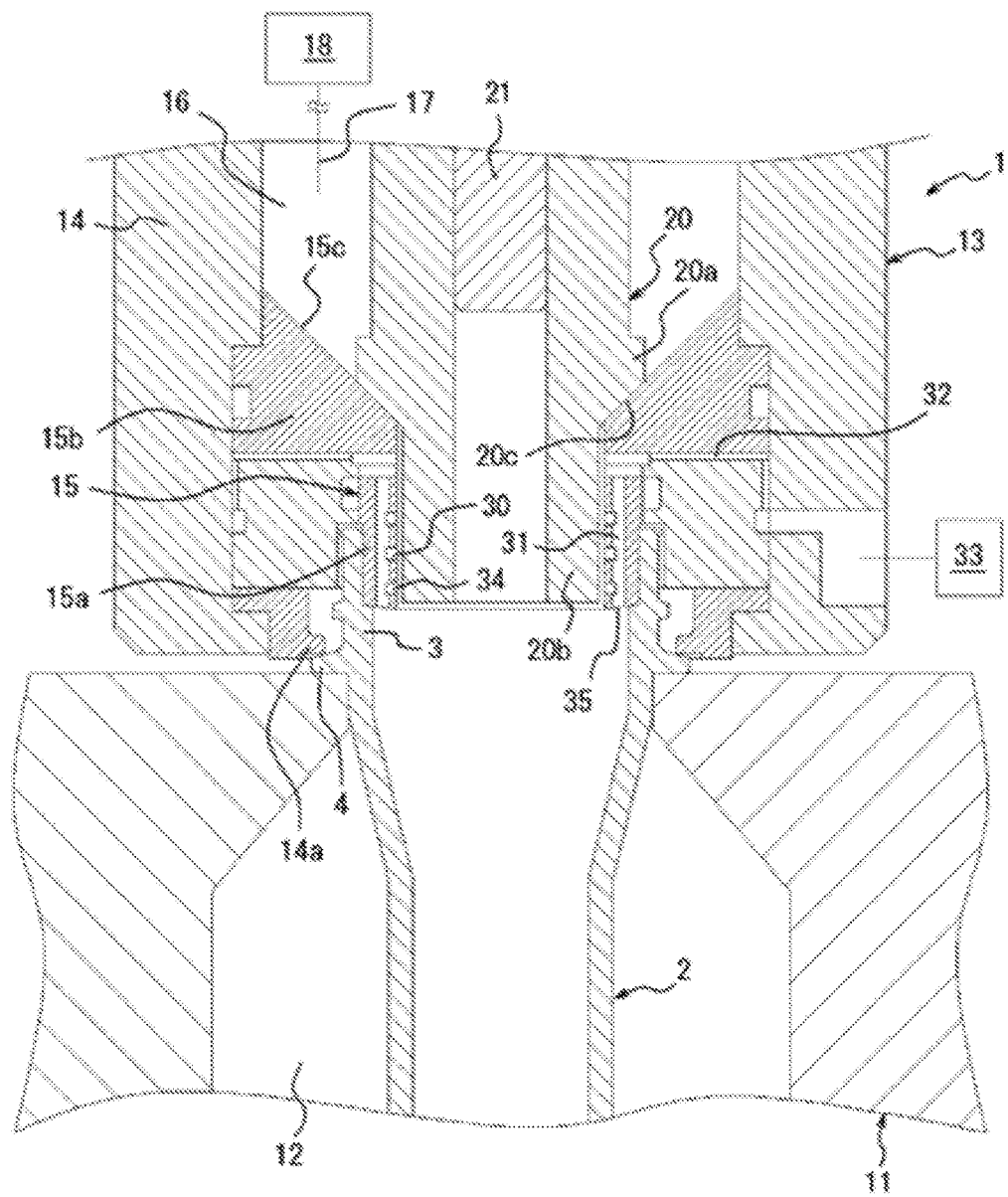
FIG. 1 is a cross-sectional drawing illustrating an enlarged view of the primary elements of a blow molding device incorporating the principles of the present invention.

A blow forming device 1 embodying the principles of the present invention is illustrated in FIG. 1 and blow forms a resin preform 2 into a container of a predetermined shape, and includes a mold 11 for blow molding in which the preform 2 is disposed. While only a portion of the mold 11 is illustrated in the drawing, a cavity 12 of the mold 11 is provided in a bottle shape and the upper surface of the mold 11 include an upward opening. The preform 2 is mounted in the mold 11 in a standing orientation where a mouth part 3 is on the upper side, protruding upward from the cavity 12. While the details are not illustrated in the drawings, the mold 11 can be opened on the left and right, and the molded container can be removed from the mold 11 by opening the mold 11 in this manner.

A thermoplastic resin material that exhibits stretchability when heated, such as, for example, polypropylene (PP), polyethylene terephthalate (PET), and polyethylene (PE), is formed into a bottomed tube shape by injection molding, compression molding, extrusion molding, or the like and can be used as the preform 2.

On an upper side of the mold 11 is provided a nozzle unit 13 that is relatively movable in a vertical (axial) direction relative to the mold 11. The nozzle unit 13 has a main body block 14. Note that in the construction illustrated in the drawing, the main body block 14 is configured as a combination of a plurality of members, but the description of these details is omitted.

A cylindrical nozzle 15 is provided on the nozzle unit 13. The nozzle 15 is provided with a nozzle main body 15a and a holding part 15b. The main body 15a is formed in a cylindrical shape having an outer radius that is smaller than the inner radius of the mouth part 3 of the preform 2. The holding part 15b has a large radius and is provided as one body on the upper side of the nozzle main body 15a. The holding part 15b is held and fixed at the inner surface of the main body block 14. Note that the nozzle 15 can be formed from, for example, a steel material, a resin material, and the like.

The nozzle 15 is disposed on the same axis as the cavity 12 of the mold 11, and when the nozzle unit 13 is lowered to a predetermined position, the nozzle main body 15a is inserted from the lower end side of the nozzle unit 13 into the mouth part 3 of the preform 2 that has been mounted on the mold 11.

A supply channel 16 is provided in the interior of the main block 14 extending in the vertical direction, and the supply channel 16 is connected to the nozzle 15 from the upper end side. Further, a pressurized fluid supply part 18 is connected to the supply channel 16 via a pipe 17. The pressurized fluid supply part 18 can supply incompressible fluid that has been pressurized to a predetermined pressure to the supply channel 16 via the pipe 17. In other words, the pressurized fluid supply part 18 can supply pressurized incompressible fluid to the preform 2 via the pipe 17, the supply channel 16, and the nozzle 15 during blow molding.

While it is preferable to use a configuration that uses, for example, a plunger pump as a pressurizing source for the pressurized fluid supply part 18, as long as incompressible fluid that has been pressurized to a predetermined pressure can be supplied to the supply channel 16, other configurations may be used.

A liquid having a relatively high viscosity such as, for example, shampoo or liquid soap, may be used as the incompressible fluid supplied to the supply channel 16, or in other words, to the preform 2, from the pressurized fluid supply part 18. In this case, the viscosity of the incompressible fluid at the time of being supplied to the preform 2 is preferably 10000 mPa·s or less.

A sealing body 20 for opening and closing the nozzle 15 is disposed movable in the vertical direction in the interior of the supply channel 16. As illustrated in the drawings, the sealing body 20 may, for example, have a configuration provided with, as one body, a sealing body main body part 20a having a cylindrical bar shape extending along the axis center of the supply channel 16 and an extended part 20b protruding downward from the lower end of the sealing body main body part 20a.

The upper end of the nozzle 15, that is, the upper surface (inner surface) of the holding part 15b of the nozzle 15 defines a closing face 15c having a tapered shape; when the sealing body 20 moves to the closed position, which is the downward stroke end, and a tapered face 20c provided on the lower end of the sealing body main body part 20a contacts the closing face 15c, communication between the supply channel 16 and the nozzle main body 15a is cut off by the seal body 20, closing the nozzle 15. Meanwhile, when the sealing body 20 moves upward from the closed position to the open position, the tapered face 20c moves away from the closing face 15c of the nozzle 15, the nozzle 15 is opened, and communicates with the supply channel 16.

Thus, the nozzle main body 15a is inserted into the mouth part 3 of the preform 2 disposed in the mold 11, and by opening the nozzle 15 via the sealing body 20 with the pressurized fluid supply part 18 being in an operating state, pressurized incompressible fluid is supplied to the interior of the preform 2 from the pressurized fluid supply part 18 through the nozzle 15, allowing the preform 2 to be blow molded. Further, by closing the nozzle 15 via the sealing body 20 after blow molding, the supply of incompressible fluid to the container can be stopped after blow molding.

The extended part 20b of the sealing body 20 is formed in a cylindrical shape having an outer diameter that is slightly smaller than the inner diameter of the nozzle main body 15a, and is disposed on the inside of the nozzle main body 15a in a state of leaving a slight gap to the inner peripheral surface of the nozzle main body 15a when the sealing body 20 is in the closed position. Further, when the sealing body 20 is in the closed position, the lower end of the extended part 20b is recessed and positioned slightly on the upper side of the lower end of the nozzle main body 15a, and is close to the lower end surface of the nozzle main body 15a.

The blow molding device 1 is provided with a stretching rod 21 for stretching the preform 2 in a vertical direction. The stretching rod 21 is mounted slideably in a hole provided in the axis center of the sealing body 20, and is relatively movable in the axial direction, or in other words, the vertical direction, relative to the sealing body 20. Upon blow molding, by moving the stretching rod 21 in the downward direction relative to the sealing body 20, the preform 2 disposed in the mold 11 can be stretched in the axial direction (vertical direction) by the stretching rod 21 in the interior of the cavity 12. In other words, the blow molding device 1 can biaxially blow mold the preform 2.

A tab part 14a is provided on the lower end of the main body block 14, and when the nozzle unit 13 is lowered to a predetermined position and the nozzle main body 15a is in a state of being inserted into the mouth part 3 of the preform 2, a neck support part 4 is held between the tab part 14a and the upper surface of the mold 11, fixing the preform 2 to the mold 11.

The blow molding device 1 is provided with a suction mechanism for preventing dropping and falling of incompressible fluid from the nozzle 15 after blow molding. The suction mechanism is provided with a plurality of suction holes 30 provided on an inner peripheral surface of the nozzle 15, a vertical hole 31 provided extending along the nozzle main body 15a in the axial direction, and a suction pump 33 that connects to a vertical hole 31 via a suction path 32.

Figure 2:
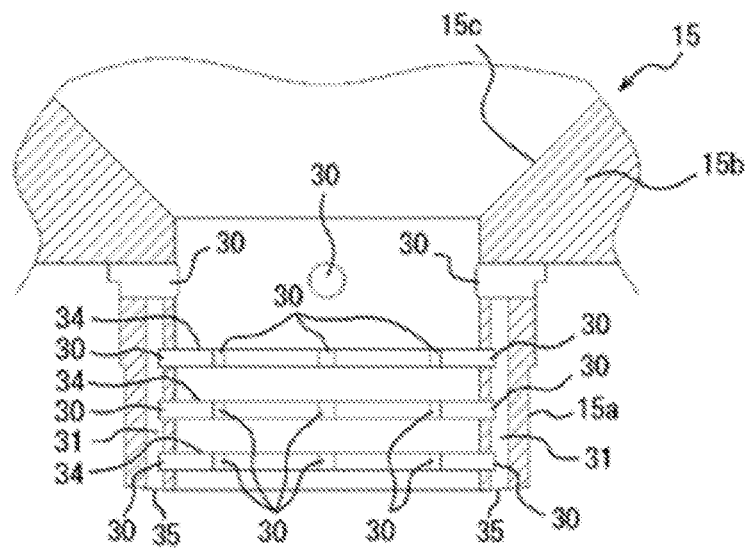
FIG. 2 is a vertical cross-sectional drawing of the nozzle illustrated in FIG. 1.
Figure 3:
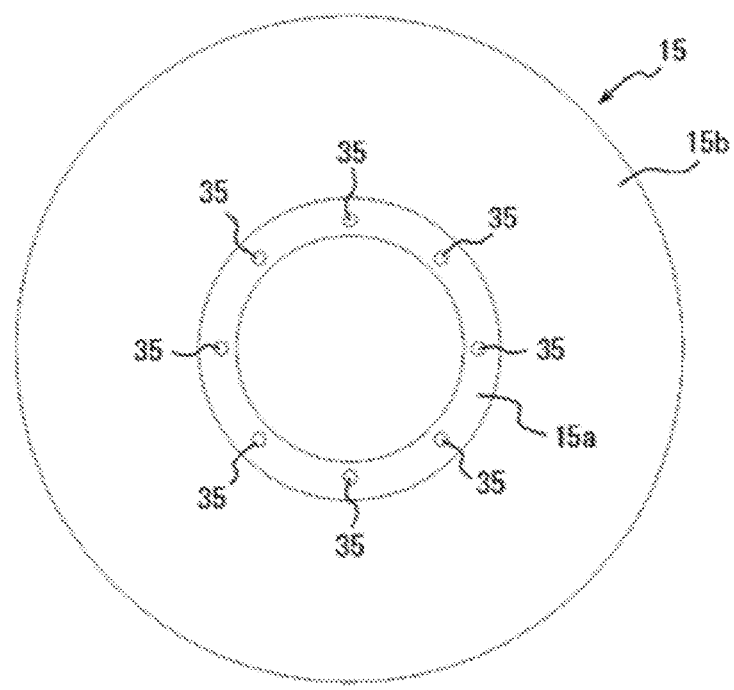
FIG. 3 is a bottom view of the nozzle illustrated in FIG. 1.

As illustrated in FIG. 2 and FIG. 3, four suction holes 30 are provided disposed in a row having an even interval in the circumferential direction on the inner peripheral surface of the nozzle main body 15a, on the side of the holding part 15b. Also, in addition to these four suction holes 30, and letting one set be three suction holes 30 provided downward from the suction holes 30 in a row toward the axial direction, on the inner peripheral surface of the nozzle main body 15a is provided eight sets in a row with an even interval in the circumferential direction. In other words, a total of 28 suction holes 30 are provided on the inner peripheral surface of the nozzle main body 15a.

Meanwhile, eight vertical holes 31 are provided on the nozzle main body 15a of the nozzle 15 in a row having an even interval in the circumferential direction, and each of the three suction holes 30 in a set is connected to each other by a corresponding vertical hole 31. Note that the four suction holes 30 on the side closest to the holding part 15b are each connected to other suction holes 30 by corresponding vertical holes 31.

In the case illustrated in the drawing, on the inner peripheral surface of the nozzle main body 15a are provided three ring-shaped slits 34 extending along the circumferential direction of the inner peripheral surface, in a row with an interval open toward the axial direction (vertical direction) of the nozzle 15. These ring-shaped slits 34 are each formed having a depth that reaches the vertical holes 31, and the three lower suction holes 30 of each set are each formed in the region where the ring-shaped slits 34 intersect with the vertical holes 31. In other words, the vertical holes 31 formed on the interior of the nozzle main body 15a open to the inner peripheral surface of the nozzle main body 15a at the regions of intersection with each ring-shaped slit 34, and the openings are provided by the suction holes 30. According to such a configuration, a plurality of suction holes 30 that are connected to each other by their respective vertical holes 31 can easily be formed on the nozzle main body 15a.

Note that in FIG. 1, for convenience, only one suction hole 30, vertical hole 31, and ring-shaped slit 34 each are given a symbol.

As illustrated in FIG. 1, the upper end of each vertical hole 31 is connected to the suction pump 33 via the suction path 32. Further, the suction pump 33 may be configured as, for example, a vacuum pump or the like, and is connected to each suction hole 30 via the suction path 32 and the vertical hole 31. The suction pump 33 can cause each suction hole 30 to exhibit a suction force for suctioning the incompressible fluid adhered to the nozzle main body 15a.

From among the plurality of suction holes 30 provided on the inner peripheral surface of the nozzle main body 15a, the lowest-disposed suction hole 30 is preferably disposed in the vicinity of the lower end of the nozzle main body 15a. As illustrated in FIG. 1, by having such a disposition, when the sealing body 20 is in the closed position, the lower end of the extended part 20b of the sealing body 20 is close to the lowest-disposed suction hole 30, allowing the incompressible fluid adhering to the lower end surface of the sealing body 20 to be effectively suctioned by the lowest-disposed suction hole 30.

In this case, when the sealing body 20 is in the closed position, the lowest suction hole 30 can be disposed such that it is positioned slightly above the lower end of the extended part 20b of the sealing body 20; however, it can also be disposed at the same height as the lower end of the extended part 20b of the sealing body 20, or it can be displaced such that it is positioned slightly below the lower end of the extended part 20b of the sealing body 20.

In the case illustrated in the drawing, by having the lower end of the vertical hole 31 open to the lower end face of the nozzle main body 15a, a downward-facing suction hole 35 is formed on the lower end face of the nozzle main body 15a. The downward-facing suction hole 35 is also connected to the suction pump 33 via the vertical holes 31 and the suction path 32. Thus, incompressible fluid adhered to the lower end face of the nozzle main body 15a can be efficiently suctioned by the downward-facing suction hole 35.

A procedure for blow forming the preform 2 with such a blow forming device 1 is described next.

In a state of the sealing body 20 being in the closed position and the nozzle 15 being closed, the preform 2 is disposed (mounted) in the mold 11, and next, the nozzle unit 13 is lowered and the nozzle main body 15a is inserted into the mouth part 3 of the preform 2 (the state illustrated in FIG. 1). At this time, the lower end of the stretching rod 21 is at the original starting position, positioned upward from the lower end of the extended part 20b of the sealing body 20.

Figure 4:
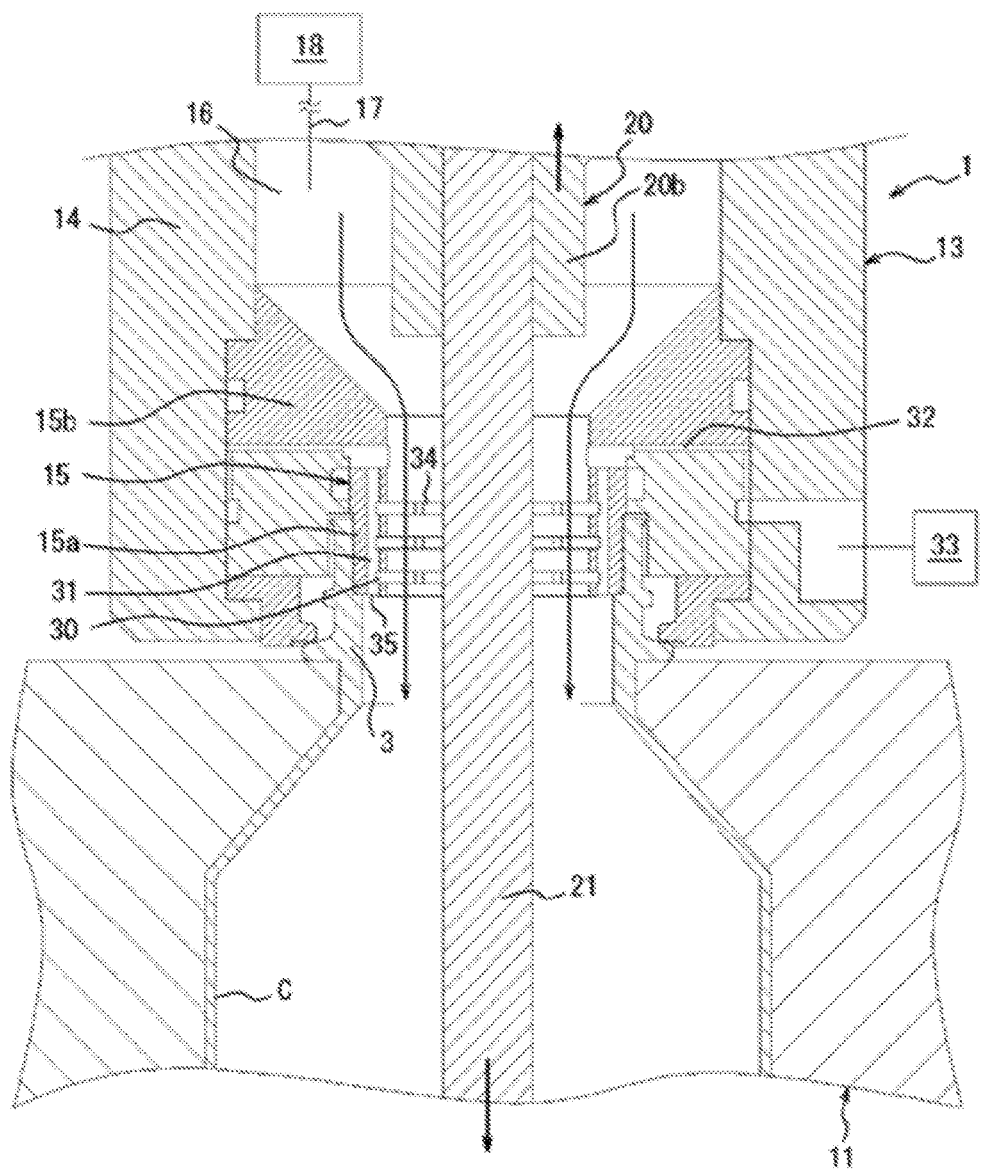
FIG. 4 is a cross-sectional drawing of the blow molding device illustrated in FIG. 1 during blow molding.

Next, the sealing body 20 moves to the open position and the nozzle 15 is opened. When the nozzle 15 opens, pressurized incompressible fluid is supplied to the interior of the preform 2 via the supply channel 16 and the nozzle 15 from the pressurized fluid supply part 18, and the preform 2 is blow molded (liquid blow molded) by the incompressible fluid. Also, when blow molding, the stretching rod 21 moves downward, and the preform 2 is stretched in the axial direction (vertical direction) by the stretching rod 21. With such a biaxial stretch blow molding, the preform 2 is formed into a bottle-shaped container C along the cavity 12 of the mold 11 (the state illustrated in FIG. 4).

Figure 5:
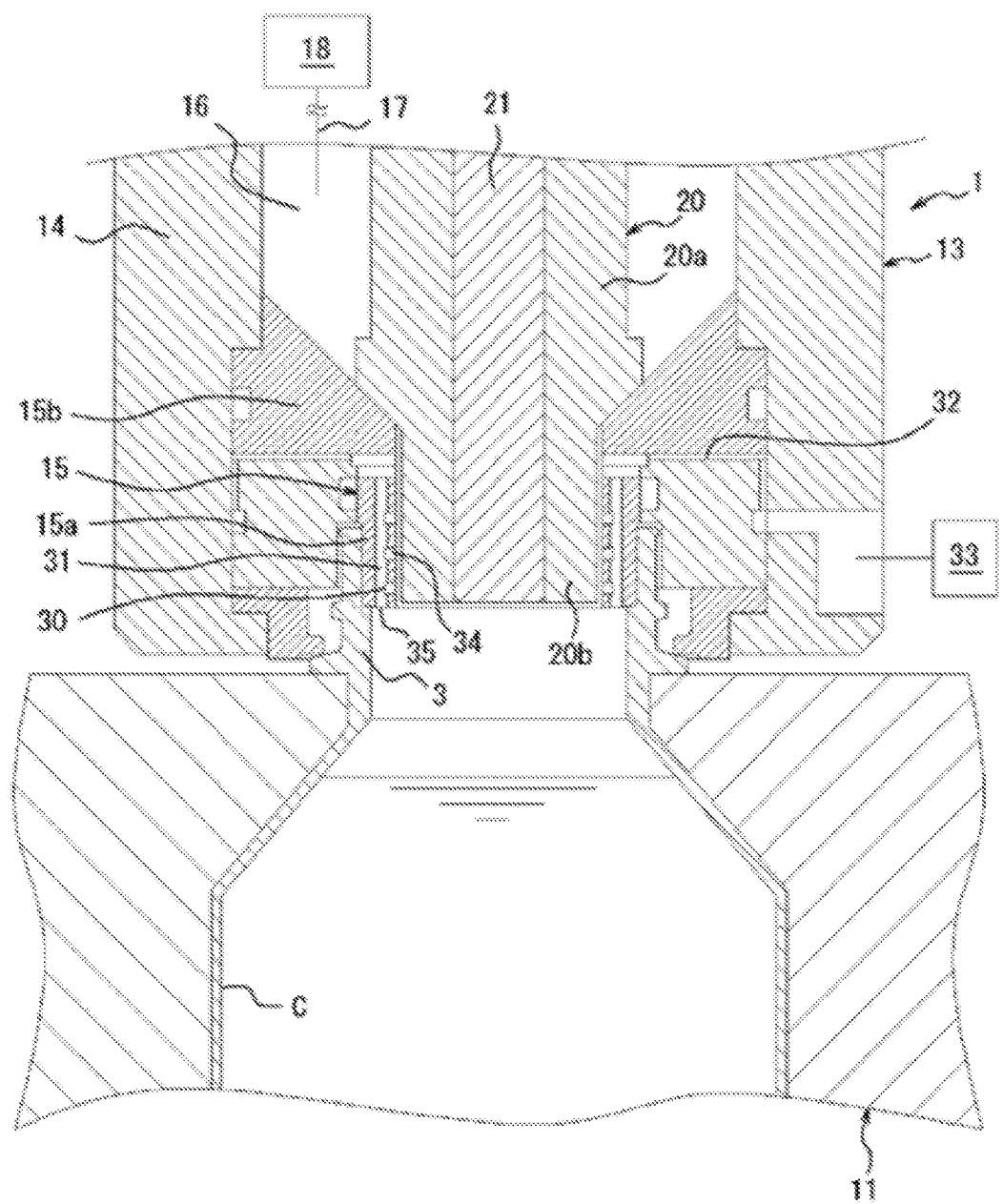
FIG. 5 is a cross-sectional drawing illustrating the blow molding device illustrated in FIG. 1 when the sealing body is closed after blow molding.

When blow molding is finished, the sealing body 20 moves downward to the closed position, the nozzle 15 is closed, and the supply of incompressible fluid is stopped; also, the lower end of the stretching rod 21 rises to a position that matches the lower end of the extended part 20b of the sealing body 20 (the state illustrated in FIG. 5).

Further, after blow molding is completed, the suction pump 33 begins operating, and the incompressible fluid adhered to the surface of the nozzle 15, the sealing body 20, and the stretching rod 21 is suctioned from the suction holes 30, 35.

Figure 6:
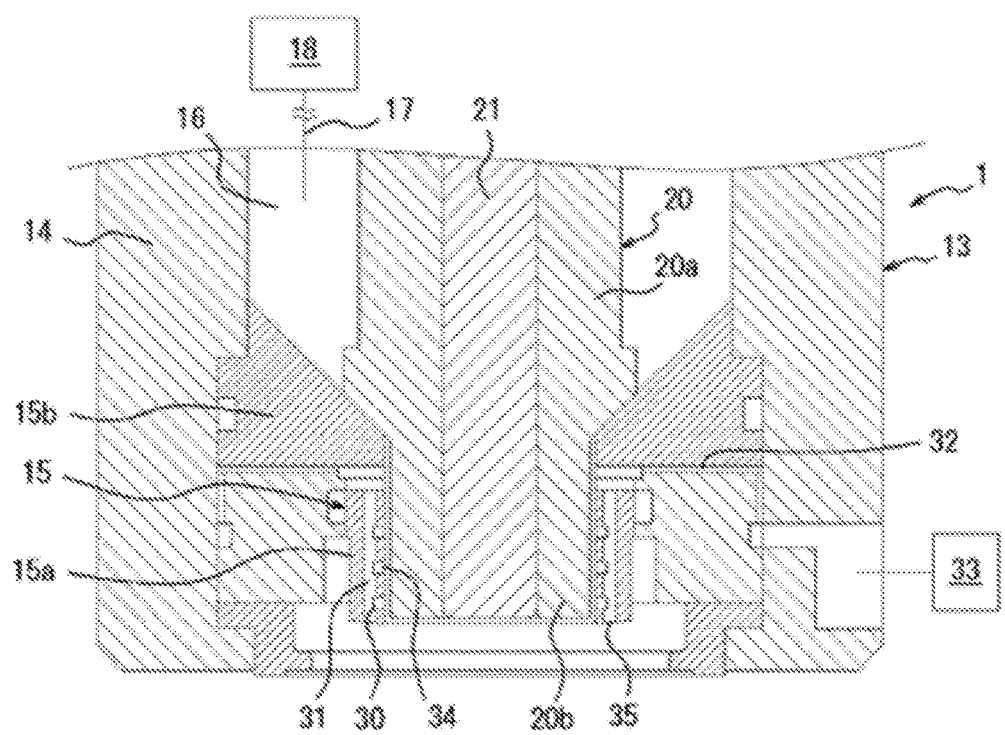
FIG. 6 is a cross-sectional drawing illustrating the blow molding device of FIG. 1 when the nozzle is separated from the mouth part after blow molding.
Figure 6:
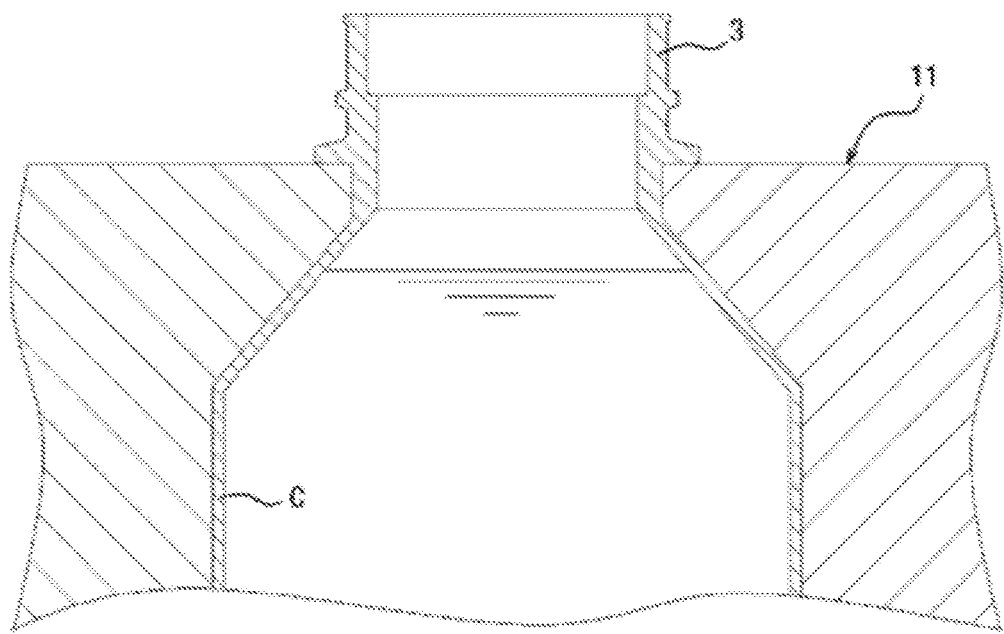

At this time, because a plurality of suction holes 30 is provided in a row toward the axial direction of the inner peripheral surface of the nozzle main body 15a, the incompressible fluid that has adhered to the inner peripheral surface of the nozzle main body 15a during blow molding and would drip and fall from the upper side to the lower side of the nozzle main body 15a can be effectively suctioned by the suction holes 30. In particular, as in the present embodiment, by having a configuration where the suction holes 30 are provided at the intersecting portions of the ring-shaped slits 34 and the vertical holes 31, the incompressible fluid that has adhered to the inner peripheral surface of the nozzle main body 15a during blow molding and will drip and fall from the upper side to the lower side of the nozzle main body 15a can be held by the ring-shaped slits 34 while they are suctioned by the suction holes 30, allowing for more effective suctioning of the incompressible fluid. Thus, as illustrated in FIG. 6, when the nozzle unit 13 is raised after blow molding and the nozzle main body 15a is separated from the mouth part 3 of the container C, the incompressible fluid adhered to the inner surface of the nozzle main body 15a can be prevented from dropping and falling toward the container C or mold 11 after molding.

In this manner, the blow molding device 1 has a plurality of suction holes 30 provided in a row toward the axial direction of the inner peripheral surface of the nozzle main body 15a, allowing effective suctioning of the incompressible fluid adhered to the inner peripheral surface of the nozzle main body 15a by the suction holes 30 and preventing the incompressible fluid from dripping and falling from the nozzle 15. In particular, when using a liquid with relatively high viscosity such as shampoo or liquid soap, the liquid is prevented from dripping falling, and blow molding can be performed efficiently without increasing cycle time.

Further, with such a blow molding device 1, by providing the extended part 20b on the sealing body 20, the space on the inside portion of the nozzle main body 15a when the sealing body 20 is closed is made only a small gap between the inner peripheral surface of the nozzle main body 15a and the outer peripheral surface of the extended part 20b, allowing the amount of incompressible fluid adhered to the inner peripheral surface of the nozzle main body 15a to be reduced. Further, the incompressible fluid in the gap can be effectively suctioned from the plurality of suction holes 30. Thus, when the nozzle unit 13 is raised after blow molding and the nozzle main body 15a is separated from the mouth part 3 of the container C, the incompressible fluid can be more surely prevented from dripping and falling toward the container C or the mold 11 from the lower face of the nozzle main body 15a and the sealing body 20.

In particular, as in the present embodiment, when the lowest-disposed suction hole 30 from among the plurality of suction holes 30 provided on the inner peripheral surface of the nozzle main body 15a is disposed near the lower end of the nozzle main body 15a, incompressible fluid adhered to the lower end face of the nozzle main body 15a and the sealing body 20 can be effectively suctioned along the bottom end face, and the incompressible fluid can be more surely prevented from dripping and falling.

Further, with the blow molding machine 1, because a downward-facing suction hole 35 is provided on the lower end face of the nozzle main body 15a, the incompressible fluid that has flowed and fallen from the upper side of the nozzle main body 15a that has adhered to the lower end face of the nozzle main body 15a can be more surely suctioned from the suction hole 35. This allows the incompressible fluid to be more surely prevented from dripping and falling from the nozzle main body 15a toward the container C or the mold 11. Also, the incompressible fluid adhered to the lower end face of the sealing body 20 can be effectively suctioned by the downward-facing suction hole 35.

However, after blow molding, when the lower end of the stretching rod 21 is raised to the original starting position positioned on the upward side from the lower end of the extended part 20b of the sealing body 20, a space is created in the sealing body 20 where the stretching rod 21 is not disposed (see FIG. 1), and incompressible fluid adheres to the inner surface of the space. Then, if the nozzle unit 13 is raised in that state, the incompressible fluid adhered to the inner surface of the space is pressed out toward the lower end of the sealing body 20 by the stretching rod 21, and drips and falls downward from the lower end of the sealing body 20.

In contrast, with the blow molding device 1, by temporarily raising the lower end of the stretching rod 21 after blow molding to a position matching the lower end of the extended part 20b of the sealing body 20, no space is made for the incompressible fluid to enter on the inside of the sealing body 20. Further, by performing suction from the suction holes 30 in this state, incompressible fluid adhering to the surface of the sealing body 20 is suctioned. Then, thereafter, when raising the nozzle unit 13, or in other words, the nozzle 15, from the mouth part 3 of the nozzle 15 and separating the nozzle main body 15a from the mouth part 3 of the container C, as illustrated in FIG. 6, the stretching rod 21 is synchronized with the nozzle 15 and the sealing body 20, or in other words, the stretching rod 21 is made to rise as one body with the sealing body 20. This eliminates the adherence of incompressible fluid to the inner surface of the sealing body 20 and the downward pressing out of adhered incompressible fluid, and can effectively prevent incompressible fluid from dripping and falling from the sealing body 20.

Note that when raising the nozzle unit 13 after blow molding, the nozzle unit 13 may be temporarily raised to a predetermined position (for example, a position 1.4 mm away in the upward direction from the position during blow molding) such that the lower end of the nozzle main body 15a is slightly apart from the upper face of the incompressible fluid, suction performed in that state from the suction holes 30 for a predetermined time (for example, three seconds), and thereafter, the nozzle unit 13 may be raised to a predetermined position illustrated in FIG. 6. Such a configuration allows the incompressible fluid in the container C to be removed from the lower end of the nozzle main body 15a while suction is performed via the suction holes 30, 35 to more surely prevent the incompressible fluid from dripping and falling.

The present invention is not limited to the embodiment, and various changes are possible within a scope that does not deviate from the intent thereof.

For example, if a plurality of suction holes 30 are provided in a row toward the axial direction of the nozzle 15 on the inner peripheral surface of the nozzle main body 15a, the number, position, shape, and the like of the suction holes 30 and vertical holes 31 provided on the nozzle 15 may be set arbitrarily. Also, the ring-shaped slits 34 are not limited to three slits, but an arbitrary number may be provided, whether it is providing only one slit or providing a plurality of slits other than three slits. Further, suction holes 30 may be provided directly on the inner peripheral surface of the nozzle main body 15a without using ring-shaped slits 34.

Also, the blow molding device 1 may have a configuration where a stretching rod 21 is not provided, a configuration where an extended part 20b is not provided on the sealing body 20, or a configuration where the stretching rod 21 does not rise synchronously with the nozzle 15 after temporarily stopping after blow molding, but rises to the original starting point as is after blow molding.

Further, a configuration is possible where suck-back is performed after blow molding where the pressurized fluid supply part 18 is operated in a reverse direction immediately before closing the sealing body 20 to suck back a predetermined amount of incompressible fluid form the container C toward the supply channel 16.

What is claimed is:

1. A blow molding device for blow forming a resin preform into a container of a predetermined shape, comprising:
   a mold having an opening configured to receive the preform therein for blow forming;
   a cylindrical nozzle that is moveable between a retracted position and an inserted position in which the nozzle is inserted into a mouth part of the preform;
   a pressurized fluid supply part configured to supply a pressurized incompressible fluid to the nozzle via a supply channel;
   a sealing body that is movable between a closed position that contacts and closes the nozzle and an open position that is apart from and opens the nozzle;
   a plurality of suction holes provided in at least two rows on an inner peripheral surface of the nozzle and positioned toward an axial end of the nozzle that is inserted into the mouth part of the preform;
   a vertical hole extending along an axial direction of the nozzle and connecting a plurality of the suction holes to each other, and
   a suction pump connected to the vertical hole via a suction path and configured to apply a suction force to a plurality of the suction holes for suctioning incompressible fluid adhered to the nozzle.

2. The blow molding device according to claim 1, wherein the vertical hole extends to a bottom end surface of the nozzle and forms the downward-facing suction holes.

3. The blow molding device according to claim 1, wherein a plurality of ring-shaped slits is provided on the inner peripheral surface of the nozzle and located toward the axial end of the nozzle, and the suction holes being formed at regions intersecting each ring-shaped slit with the vertical hole.

4. The blow molding device according to claim 1, wherein the sealing body is provided with a sealing body main body part that contacts the nozzle when the sealing body is in the closed position, and an extended part that is provided protruding from the sealing body main body and disposed on an inside of the nozzle leaving a gap to an inner peripheral surface of the nozzle when the sealing body is in the closed position, wherein a distal end of the extended part is adjacent a lowest disposed one of the suction holes when the sealing body is in the closed position.

5. The blow molding device according to claim 1, wherein the sealing body is provided with a sealing body main body part that contacts the nozzle when the sealing body is in the closed position, and an extended part that is provided protruding from the sealing body main body and disposed on an inside of the nozzle leaving a gap to an inner peripheral surface of the nozzle when the sealing body is in the closed position, wherein a lower end of the extended part is adjacent a lower end surface of the nozzle when the sealing body is in the closed position.

6. The blow molding device according to claim 1, wherein the lowest-disposed suction hole from among the plurality of suction holes is disposed in the vicinity of a lower end of the nozzle.

7. The blow molding device according to claim 1, further comprising a stretching rod, the stretching rod provided at an axial center of the sealing body and being movable in an axial direction relative to the sealing body, the stretching rod being configured to move downward during blow molding and stretch the preform in the axial direction, wherein after stretching the preform the stretching rod is configured to raise to a position such that a lower end of the stretching rod corresponds to a lower end of the sealing body when the sealing body is in the closed position, and is configured to rise synchronized with the sealing body when the sealing body rises from the mouth part with the nozzle.

8. The blow molding device according to claim 1, wherein the viscosity of the incompressible fluid at the time of being supplied to the preform is 10000 mPa·s or less.

* * * * *